United States Patent [19]

Hunter et al.

[11] Patent Number: 4,873,645

[45] Date of Patent: Oct. 10, 1989

[54] SECURE POSTAGE DISPENSING SYSTEM

[75] Inventors: Kevin D. Hunter, Stratford; Robert T. Durst, Jr., Monroe; Jose Pastor, Westport, all of Conn.

[73] Assignee: Pitney Bowes, Inc., Stamford, Conn.

[21] Appl. No.: 134,671

[22] Filed: Dec. 18, 1987

[51] Int. Cl.[4] .......................... G06F 15/20; H04L 9/00

[52] U.S. Cl. ................................ 364/479; 364/464.02; 380/23

[58] Field of Search .................... 364/478, 479, 464.01, 364/464.02, 464.03, 466, 200 MS File, 900 MS File; 380/23, 24, 25; 902/2; 235/375, 379, 380, 381, 382, 382.5

[56] References Cited

U.S. PATENT DOCUMENTS

| | | | |
|---|---|---|---|
| 4,253,158 | 2/1981 | McFiggans | 364/900 |
| 4,376,299 | 3/1983 | Rivest | 364/900 |
| 4,752,950 | 6/1988 | Carpentier | 364/464.02 X |
| 4,757,532 | 7/1988 | Gilham | 380/23 |
| 4,775,246 | 10/1988 | Edelmann | 380/23 |
| 4,780,828 | 10/1988 | Whisker | 380/23 X |

FOREIGN PATENT DOCUMENTS 2174039 10/1986 United Kingdom .

2190044 11/1986 United Kingdom .

*Primary Examiner*—Joseph Ruggiero

*Attorney, Agent, or Firm*—Donald P. Walker; Melvin J. Scolnick; David E. Pitchenik

[57] ABSTRACT

A secure postage dispensing system is provided, which comprises: apparatus for receiving mailing information including a list of addresses, wherein the list is associated with a number of mail pieces to be sent and information indicative of the postage due for the mail pieces; structure for calculating the total postage required for the mail pieces; and structure for establishing communication with a funds control center, which is adapted to receive the total postage and the total number of mail pieces to be mailed and includes instrumentalities for effecting a funds transfer in the amount of the total postage to a carrier service and, upon completion of such funds transfer, returning a cryptographic key and a batch identifier. In addition, the dispensing system includes apparatus for using said cryptographic key to provide a unique encrypted number for each address in the list of addresses, and apparatus for outputting the list of addresses with each address having the unique encrypted number appended thereto.

17 Claims, 8 Drawing Sheets

FUNDS CONTROL CENTER

FUNDS CONTROL CENTER
ENVELOPE VALIDATION PORTION

SECURE POSTAGE DISPENSING SYSTEM

BACKGROUND OF THE INVENTION

The present invention generally relates to a secure postage dispensing system and, in particular, relates to one such system including means for receiving and storing mailing information from a user and means for providing that user with a unique encrypted number for each mail piece designated in the mailing information.

Currently, there are four generally accepted systems for accounting for postage to be mailed with a postal delivery service, such as, for example, the U.S. Postal Service (USPS). These four can generally be designated as stamps, meters, permit mail and manifest mail.

Stamps, as well known, do not lend themselves to automated application in high volume environments. In particular, the application of stamps is generally restricted to low volume mailers and are not considered a feasible system for any form of high volume mailing.

Meters are well adapted to higher volume environments, however, meters are generally mechanical in nature and therefore pose some reliability problems. In addition, postage must be loaded into the meters in advance of the actual use thereof, thus accurate work estimates must be made to ensure that the meter does not run out of funds during a particular mail run. Further, postage meters, by law, must be rented or leased and, as such, represent an ongoing cost to a customer that cannot be avoided. Still further, with respect to meter, large mail runs can occasionally be made with the meter inadvertently set to the wrong value. Such an error usually requires that the entire mail run be reprocessed.

Permit mail systems are currently available for those mailers that mail large volumes of mailpieces of the same weight. In such a system, the permittee applies a permit indicia to each mail piece, this indicia may also be preprinted, and provides a summary sheet, often referred to as a Form 3602, to the postal service upon delivery of each batch of mail to be mailed under the permit. While this system is appropriate for numerous applications, many typical mailing applications, such as, for example, billing and some types of advertising, do not meet the identical weight requirement.

A manifest mail system resolves most of the difficulties found in permit mail systems. However, a manifest mail system introduces other difficulties, at least from the viewpoint of the mail delivery service. For example, one difficulty is that since the markings on the mail piece are not applied by a secure device, such as a meter, it is considered much easier for a determined party to produce apparently valid mail in a fraudulent fashion. Thus, to augment inspection procedures, additional documentation must be provided to maintain the integrity of a manifest mail system. Partly as a result of this documentation, traditional manifested mail pieces cannot be verified subsequent to the time it has been separated from the rest of the mail batch unless the documentation that accompanies the mail specifies each and every detail of every mail piece and, simultaneously, is available to anyone wishing to verify any suspected mail piece. The difficulty so introduced lies in the fact that, by using a manifest mail system, a high volume mailer may mail many thousands of mail pieces in a single batch.

A further difficulty with manifest mail lies in the question as to whether or not the documentation, or manifest, used to validate each submitted mail batch has been properly prepared. As well known, any application program operating on an unsecure computer, for example, on the mainframe computer of the mailer, is, almost by definition, subject to tampering, alteration or other compromise. Such tampering could be made very difficult to detect but might, nonetheless, operate to print documentation for a mail batch that shows a lesser amount of postage due than is actually, in fact, required. To prevent such tampering would require a significant effort on the part of the inspecting authority for each batch of mail submitted. For example, if the documentation or manifest consists of a list of each mail piece and the postage due for that piece, the inspector would, at least, have to total the values for each and every mail piece to verify that the total presented in the documentation is correct.

In presorted manifest mail, there is the additional difficulty of ensuring the application of the exact amount of postage onto the mail piece since the postage required therefor becomes a function of the position of each mail piece in the sorted mail and the characteristics of adjacent pieces. The typical solution implemented is to meter all the mail for the minimum amount, i.e., and thereafter pay the mail delivery service an extra amount for pieces that are subsequently found not to qualify for the presorted discounts. This procedure entails verifying that all of the residuals, i.e., all of the non-qualifying mail, have been accounted and paid for.

Consequently, a postage dispensing system that overcomes the above recited difficulties is highly desirable as such a system relieves the mailer from numerous reruns, lost costs and the requirement for expensive on-site equipment.

SUMMARY OF THE INVENTION

Accordingly, it is one object of the present invention to provide a system for the payment of postage that substantially completely overcomes the above-recited difficulties.

This object is accomplished, at least in part, by a postage payment system having means for receiving and storing mailing information and means for providing a unique encrypted number for each mail piece designated via the mailing information.

Other objects and advantages will become apparent to those skilled in the art from the following detailed description read in conjunction with the appended claims and the drawings attached hereto.

BRIEF DESCRIPTION OF THE DRAWINGS

FIG. 6 is a flow chart depicting an operational embodiment of the portion of the system shown in FIG. 5*a.

DETAILED DESCRIPTION OF THE INVENTION

Figure 1:
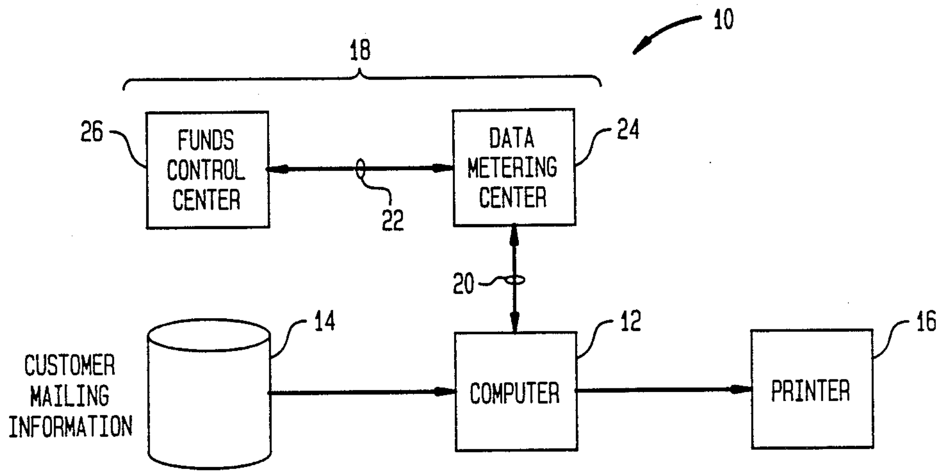
FIG. 1 is a block diagram of a system for dispensing postage embodying the principles of the present invention.

A typical environment 10 wherein the secure postage dispensing system, fully described hereinafter, may be particularly useful is shown in FIG. 1. Therein, a computer 12, under the control of the customer or system user, is adapted to access a source 14 of mailing for use by the customer information and to control a printer 16. The computer 12 is bi-directionally connected to a data metering system 18, more fully described hereinbelow, via a first communication link 20. The data metering system 18 includes a second communication link 22 that is adapted for the bidirectional communication between a data metering center 24 and a funds control center 26 such as, for example, a bank, a remote metering resetting system, a vault of a postal device, or the like. The computer 12 may be, for example, a main frame computer and the source 14 of customer mailing information may be a magnetic disk or other nonvolatile memory. In this particular environment, the data metering center 24 can be on-site with e computer 12 and, in such an arrangement, the first communication link 20 connected therebetween is a local data link. Alternatively, the data metering center 24 can be remote from the computer 12 and connected therebetween is a long distance data link. In either arrangement, the funds control center 26 is, preferably, not on-site with the customer. The particular printer 16 used, and the location thereof, is not critical to the implementation of this invention although it should be electronically controllable. In the configuration shown in FIG. 1, the data metering center 24 is, essentially, an adjunct to the computer 12 and accepts mailing data therefrom, processes it and returns it to the computer 12 of the customer for subsequent processing or printing.

Figure 2:
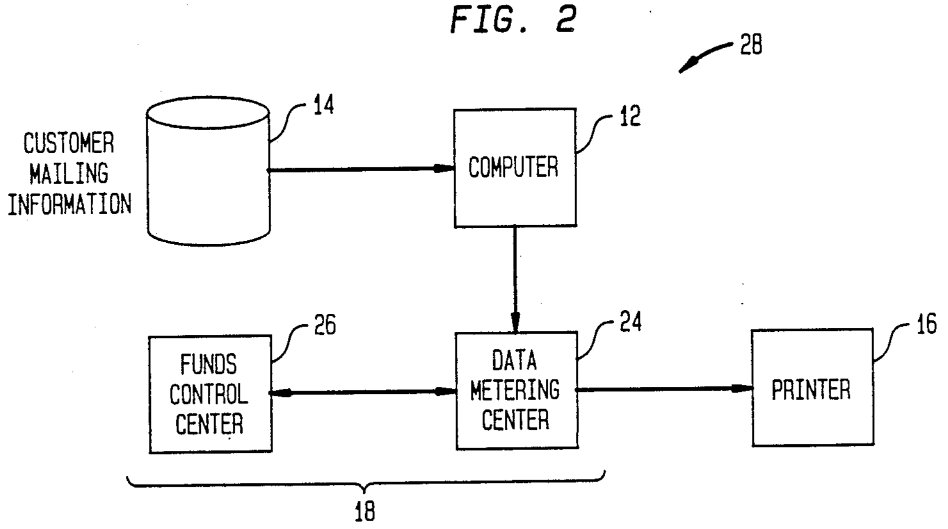
FIG. 2 is a block diagram of another system for dispensing postage also embodying the principles of the present invention.

Another environment 28 that is equally conducive to the use of the secure postage dispensing system contemplated by the present invention is shown in FIG. 2. Therein, numerals previously used to indicate particular elements are used to designate elements of similar, previously described, functionality. In the environment 28, the computer 12 of the user is not directly connected to the printer 16 that is on-site with that computer 12. In fact, the printer 16 may be at a site other than the premises of the user, such as, for example, the location of the data metering center 24. As a consequence, the environment 28 shown in FIG. 2, thus improves the overall security of the mail handling by removing the possibility of illegitimate data manipulation via the computer 12 prior to the printing of information on mail pieces. As shown in FIG. 2, the computer 12 of the user accesses a source 14 of customer mailing information and forwards information therefrom to the data metering center 24. Essentially, the data metering center 24 is in-line between the computer 12 of the user and the printer 16 and, effectively, operates transparently with respect to the computer 12 of the user by, effectively executing the printing of, for example, a batch of mail. Upon receipt of information from the computer 12, the data metering center 24, as more fully described below, receives appropriate authorization after an exchange of data with the funds control center 26, i.e. a bank or a remote meter resetting center and, upon approval of funding, directly controls the printer 16 to print the particular mail relating to the request received from the computer 12.

Figure 3:
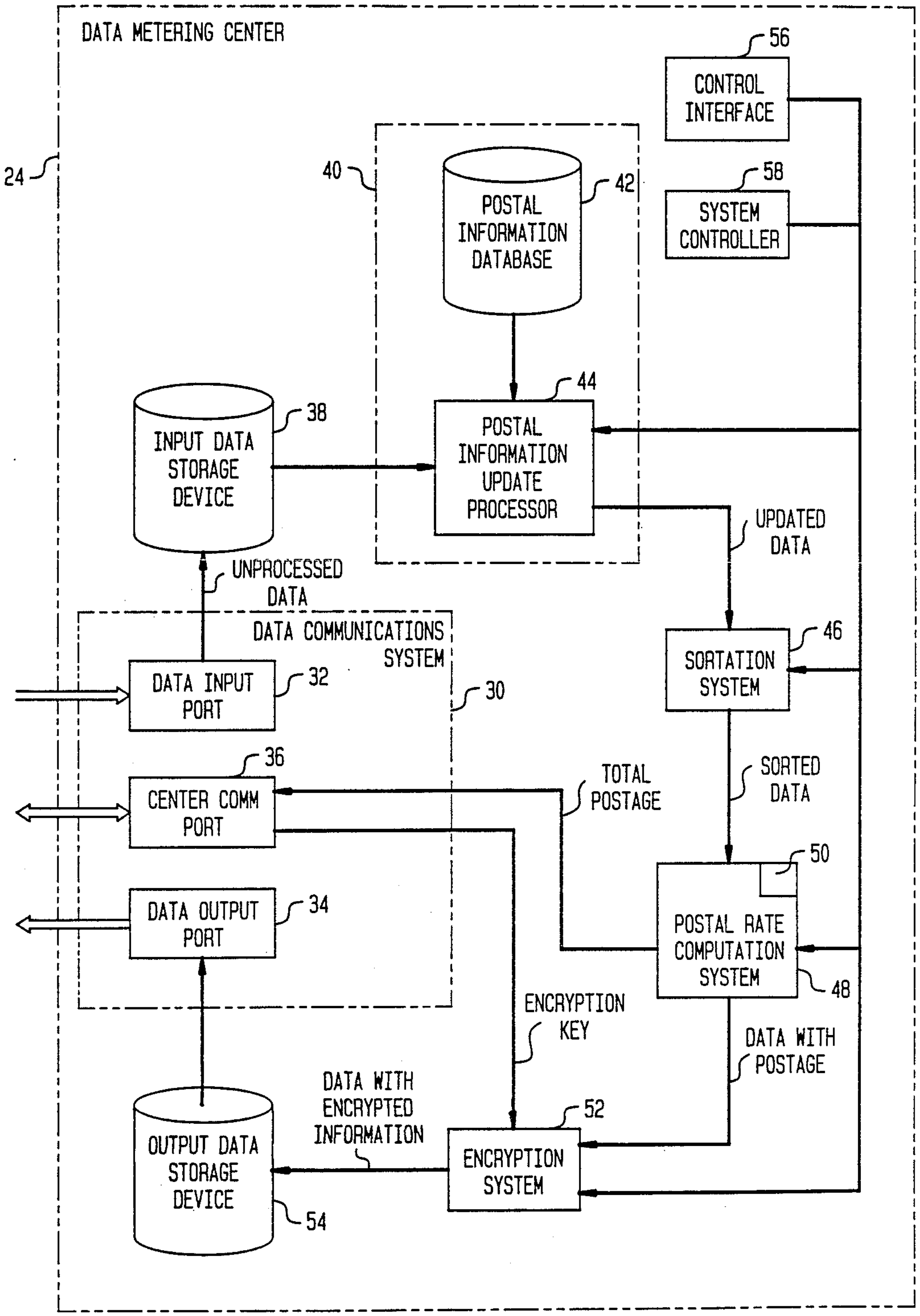
FIG. 3 is a block diagram of a data metering center particularly useful with the systems shown in FIGS. 1 and 2.

In one particular embodiment, the data metering center 24 (FIG. 3) includes a data communication system 30 that, effectively, operates to control both incoming and outgoing communications with the data metering center 24. In this embodiment, the data communication system 30 controls three ports, a data input port 32 for receiving data from the computer 12 of the user, a data output port 34 for providing the mailing information to the computer 2 of the user and a bilateral communication port 36 for exchanging information with the funds control center 26 to effect a funds transfer and to initiate an encryption process.

The data metering center 24 (FIG. 3) also includes an input data storage device 38 whereinto data received via the data input port 32 can be stored whereafter, in one embodiment, the processing thereof can occur. Such an input data storage device 38 is, preferably, a nonvolatile memory or media such as, for example, a magnetic disk, magnetic tape or the like. The input data storage device 38 operates to buffer the inputted data until the communication session between the data metering center 24 and the computer 12 of the user is completed.

The data metering center 24 (FIG. 3) further includes a means 40 for updating postal information, the means preferably includes a postal information database 42 and a postal information update processor 44. The postal information updating means 40 ensures that all modifications relating to the stored mailing data, such as the appending of zip+4, carrier route data, change of address information, of the like, is optionally incorporated in the processing of the mailing information received from the computer 12. The postal information data base 42, preferably stores data to support the postal information update processor 44 and includes such things as zip+4 data bases, carrier route look-up tables, weight-to-rate tables, change of address tables or the like.

Understandably, if desired, the inputted data from the computer 12 of the user may first be processed by the postal information updating processor 44 prior to the storage thereof in the input data storage area 38.

In the preferred embodiment, the data metering center 24 (FIG. 3) further includes means 46 for sorting mailing information received via the postal information update processor 44. The sorting means 46 is adapted to sort the mailing information into a predetermined order in accordance with instructions from the customer or in accordance with the requisite information to provide the customer with the minimal rate charges available for a particular group of addresses.

Preferably, the data metering center 24 (FIG. 3) additionally includes means 48 for determining postal rates and includes, inter alia, a postal rate computation processor 50 that calculates the requisite postage not only for each piece based on such data as the piece weight (for example, precalculated weight), but also for the batch information, using the presort discount particularly with respect to the way that mail piece fits into the mail batch, i.e., according the sortation processor and, any zip+4, or other, discount available. The postal rate computation processor 50, in the preferred embodiment, also determines the total postage due for the entire batch. As more fully discussed below, this information, in one operational mode, is provided to the funds control center 26 for effecting the payment thereof.

In the preferred embodiment, the data metering center 24 (FIG. 3) also incorporates a means 52 for encrypting information that is adapted to receive an encryption key from the funds control center 26 by means of the data communication system 30. As more fully discussed hereinafter, information is appended to each address associated with each piece of mailing data, the information includes an encrypted number representative of, inter alia, the postage paid for that mail piece. This encryption is processed within the data metering center 24 based on the encryption key assigned by, and received from, the funds control center 26.

The data metering center 24 (FIG. 3) additionally includes an output memory storage device 54 for the data received from the encryption means prior to the outputting of this data. This data storage area, in effect, buffers the data relating to a particular set of input data prior to the transmission thereof to either the customer computer 12 or the printer 16 for the purpose of printing the mail run by, or for, the user.

In the preferred embodiment, the data metering center 24 (FIG. 3) further includes a control interface 56 communicating with a system controller 58 for providing operator control over the data metering center 24. The system controller 58 includes, inter alia, the specific information to be appended to the list of addresses from the postal rate computation system in conjunction with the encryption system. The system controller 58 additionally controls the criteria for the sortation of the mail run, i.e., with respect to the available price breaks and discounts and whether actual postage is to be paid or whether the mail run is simply being performed to update and/or sort customer information. The control interface 56 is, preferably, directly connected to a system controller 58 and, in one particular embodiment, includes a keyboard and a display.

It will be understood by those skilled in the art that the functions of the postal information update processor 44, the sortation processor 46, the postal rate computation processor 50 and the system controller 58 could be implemented by using a single microprocessor that, in addition, could also include the encryption system 52. However, it is preferred that the encryption system 52, that utilizes the encryption key received from the funds control center 26 to provide encrypted information to the customer, be isolated to enhance the overall security of the data metering center 24 and the information provided thereby.

Figure 4A:
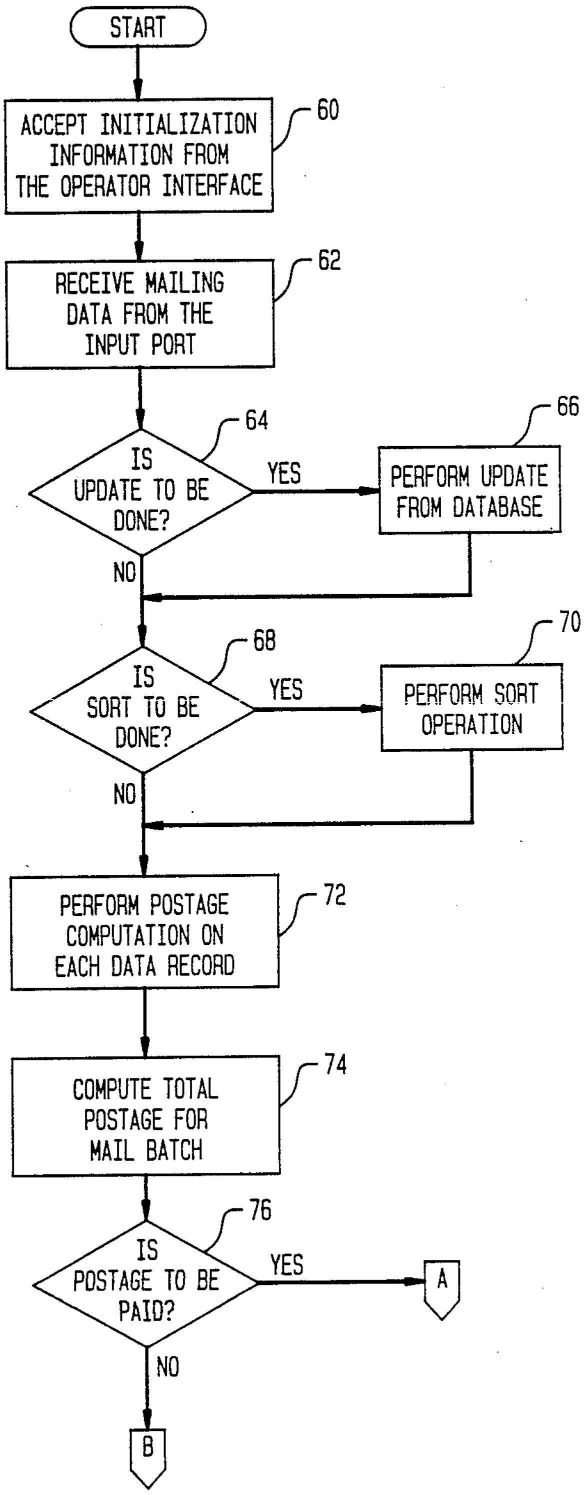
FIGS. 4*a* and 4*b* are flow charts depicting one operational embodiment of the data metering center shown in FIG. 3.
Figure 4B:
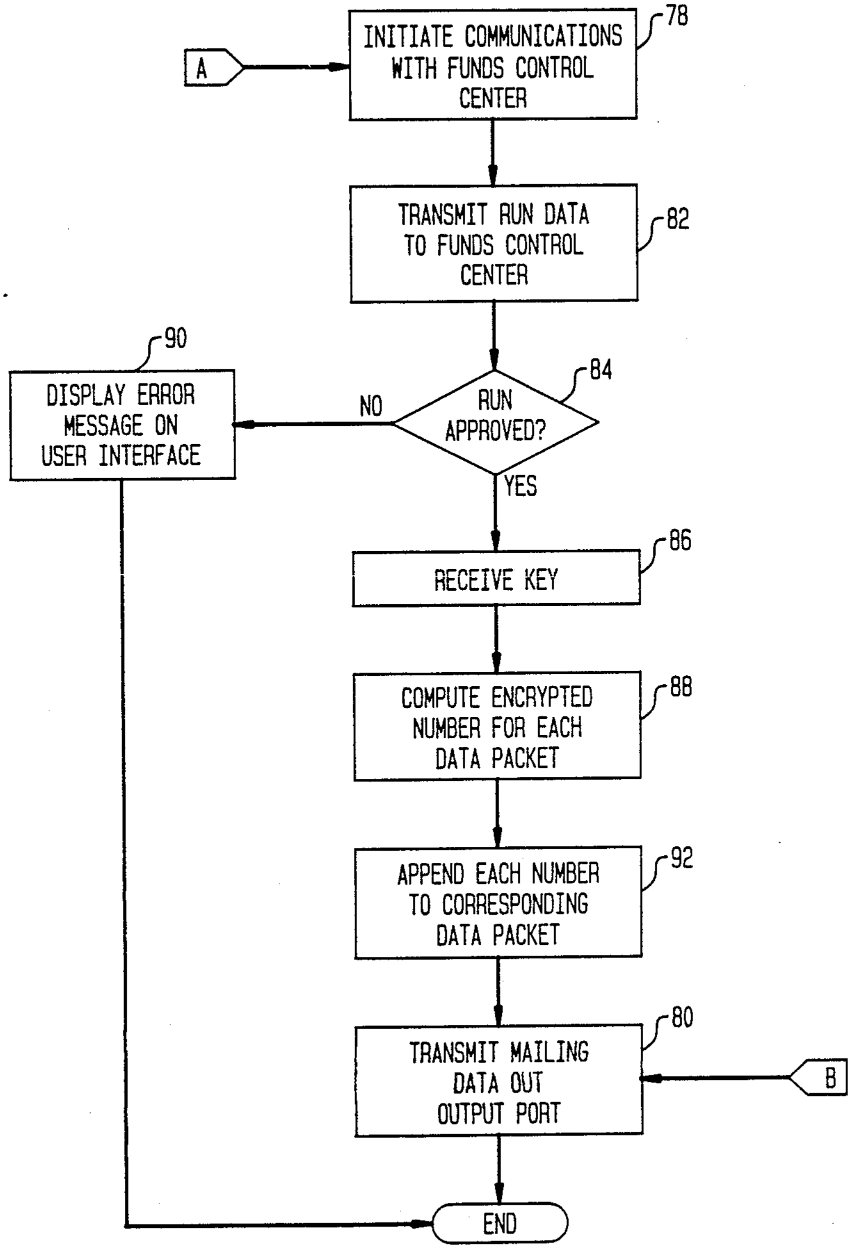

A typical operation of the data metering center 24 (FIG. 3) is depicted via the flow charts shown in FIGS. 4*a* and 4*b*. As described therein, the data metering center 24 is initialized 60 in accordance with control information received from the user interface. Mailing data is received and accepted via the data input port 62 and, in this embodiment, stored in the input data storage medium. When the data has been completely received, if an updating of the data 64 is to be prepared, the postal information updating is performed on the data in the input data storage medium 66. Preferably, this postal information updating is performed in accordance with information provided, or selected, by the user. However, for example, in the instances of rate changes and/or discount changes, the operation can also be performed under the control of the operator interface. Preferably, this updating process can also be performed as the data is received and prior to it being stored in the input data storage. Such a mode of operation, however, would introduce the potential of losing data via the telecommunication media and/or interruption. Consequently, it is preferred that the entire batch of information be stored in the input storage medium prior to any processing thereof.

Subsequent to the receipt and updating of customer mailing information, if a sort 68 is requested by the operator, the sorting process is carried out via the sort processor 70. Preferably, the sorted data is thereafter further processed by the postal rate computation processor 72, and each piece of mail is marked, within the data base, with the individual postage thereof and, if desired, with the total postal amount computed 74.

Subsequent to the computation of both individual and total postage, if the postage is to be paid 76, communication is established 78 with the funds control center 26. If postage is not to be paid, the mailing data is transmitted directly to the output port and the processing, with respect to the data metering center 24, is terminated. In the instance where postage is to be paid, appropriate data about the batch is transmitted 82 to the funds control center 26. Such data would typically include at least the total postage due and most frequently, the number of pieces, the date, the distribution, i.e., in accordance with weight and zip code, and/or any other appropriate data. Upon credit approval 84, or upon an actual transfer of funds, the data metering center 24 receives an encryption key 86 along with a resultant code and supporting data from the funds control center 26. The encryption key is communicated to the encryption system 52 along with a batch identifier and used thereat to generate 88 an encrypted number for each data item involved in the mailing. If, alternatively, the fund transfer is disapproved, an error message is displayed 90 at the control interface 56 and processing is terminated. In the instance of approval, the encrypted number for each data packet is appended 92 to that packet. As used herein the words "data packet" can refer to information relating to a single mail piece or a plurality of mail pieces. This information is then stored 80 in the output data storage device 54. Thereafter, communication is established between the data metering center 24 and the user computer 12 or, alternatively, directly to the user printer 16. The completely processed data is then transmitted for actual use by the user or use for the user via the printer 16.

Figure 5A:
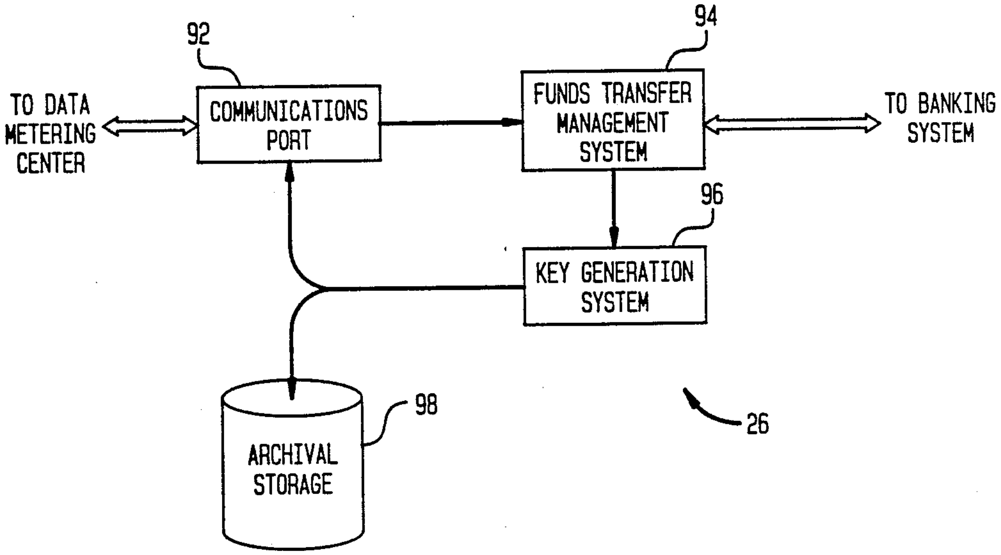
FIGS. 5*a* and 5*b* are more detailed block diagrams of portions of the system shown in FIGS. 1 and 2.

The internal architecture of the funds control center 26 is shown in FIG. 5. Essentially, the funds control center 26 supports two functions. The first function is to provide support to the data metering center 24 and its operation by managing electronic funds transfers and providing encryption keys. The second function is to operate as a validation center that permits mail pieces generated by information received from the data metering center to be validated. During the encryption key generation operation, information is provided to the funds control center 26 via a communication port 92 adapted to communicate with the bilateral communication port 36 of the data metering center 24. A funds transfer management system 94 is responsible for controlling the transfer of funds corresponding to the postage due on a particular mail batch. The funds transfer can be effected directly between the customer's account at, for example, a bank and the postal service delivery system, such as the bank account of the U.S. Postal Service. The funds transfer management system 94 can be implemented by systems known in the field of electronic funds transfer. In addition, the funds control center 26 includes an encryption key generation system 96 that generates an encryption key for the encryption occurring within the data metering center 24. This feature is significantly different from the conventional use of encryption keys for validation purposes since, usually the return of the key is the evidence, per se, of the payment of funds. As discussed above, in this instance, the encryption key is not only indicative of the successful transfer of funds, but, as more fully discussed hereinafter, is further used to provide validation data on each mail piece that, at some subsequent point in time, allows any interested party to ascertain the validity of each and every mail piece so processed regardless of the time and interrelationship with other mail pieces. The funds control center 26 further includes an archival storage device 98 for retention of the particular key generated for each batch of mail processed along with the mail piece information relating thereto.

Figure 5B:
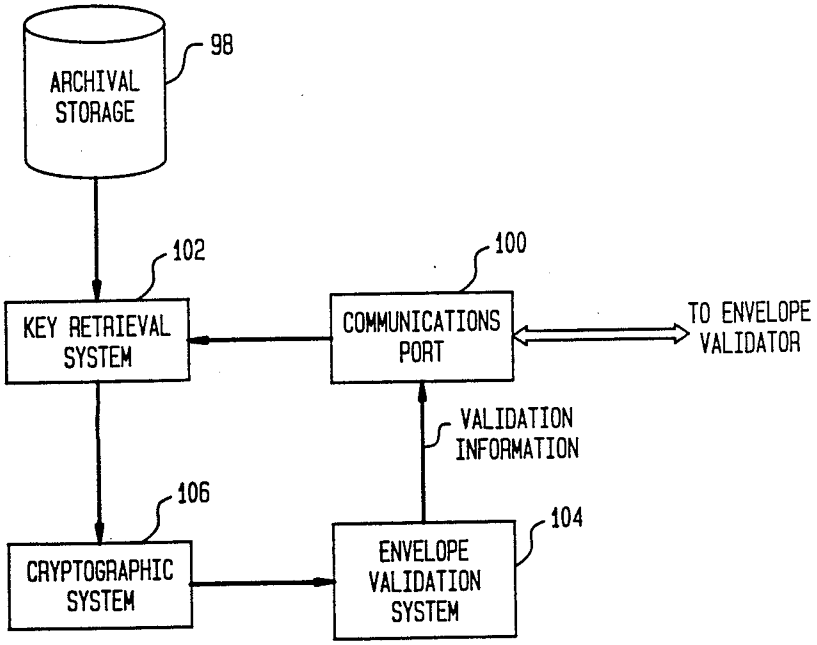

As shown in FIG. 5*b*, the validation segment of the funds control center 26 includes the archival storage 98, a communications port 100 for exchanging data from a mail piece to be validated and returning the status of that piece to the inquirer. In addition, the center 26 includes an encryption key retrieval system 102 adapted to accept data relating to the mail batch that the mail piece of interest belongs and to retrieve, from the archival storage 98, a previously stored batch data and associated encryption key. The validation portion of the funds control center 26 further includes a validation system 104 that accepts information from a cryptographic system 106 in accordance with the encryption key, the data from the envelope and data relating to the batch and, based on that information, determines whether or not the mail piece is valid. This information is returned to the inquirer via the communication port 92.

Figure 6:
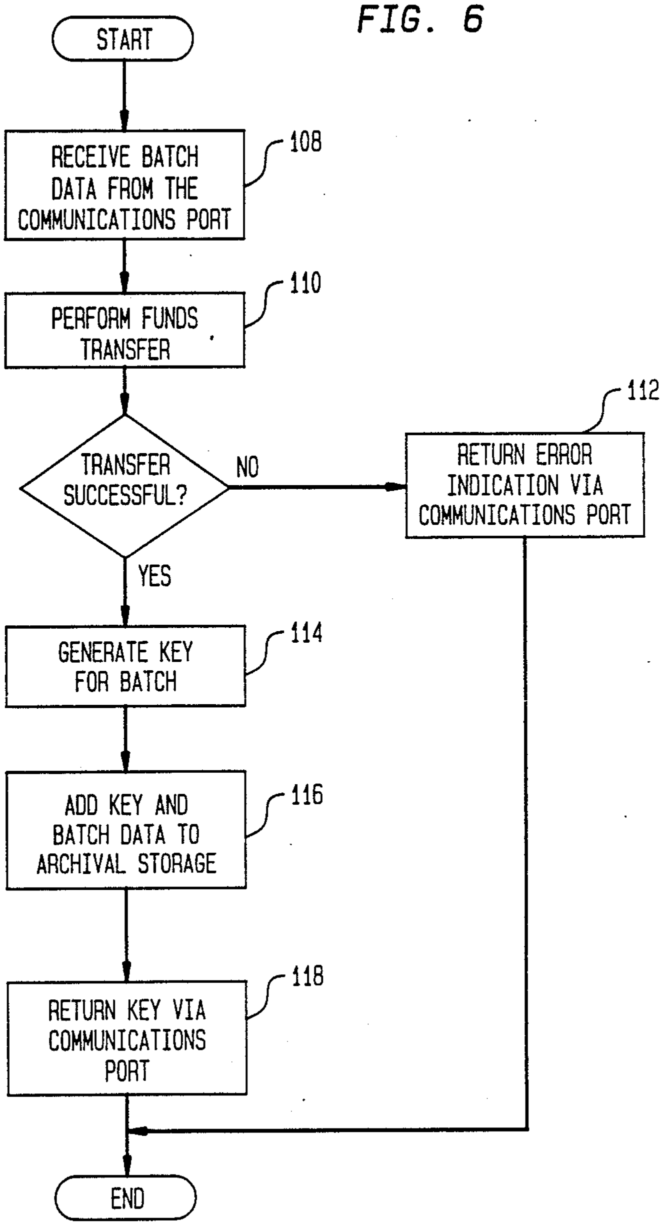

FIG. 6 is a flow chart for the operation of the encryption key generation and funds control center 26. Operationally, in one embodiment, batch information is received 108 at the funds control center 26 via the communications port 92 from a data metering center 24. The funds transfer in the amount of the postage due for the entire batch, as well as any additional service or finance charges, is then performed 110 between the customer's account and the postal service's account or an intermediate account wherefrom the postal service can be paid. As mentioned before, if the request for funds transfer is unsuccessful 112, or disapproved, an error message is returned to the data metering center 24 and further processing is terminated. Otherwise, the encryption key generation system 96 is activated to produce 114 a single encryption key that will thereafter be used for the identification of that particular batch of information. The received batch data and the generated encryption key are then stored 116 in an archival storage medium. The encryption key is then returned 118 to the data metering center 24 via the communication port 92 and, for all intents and purposes, the processing with respect to the funds control center 26, terminates.

Each mail piece generated thereafter, utilizing the data metering center 24 includes thereon a number, or cryptographic, information that can be utilized at any time, anywhere and by anyone to ascertain the validity and/or authenticity of that mail piece. Because the encryption key, as used by the data metering center 24, relates to and is common for a single batch of mail, any single mail piece can be verified, or authenticated, without reference to that specific batch of mail. That is, for example, a single piece of mail can be completely separated from the remaining pieces of mail in the batch and nevertheless, contain sufficient information about that batch and that document to enable the archival memory 98 to be accessed by the funds control center 26 to identify and thus verify and/or authenticate that piece of mail.

As well known in the art, basic verification by decryption can occur in two different forms. In one form, the encrypted information is decrypted such that the original text that was originally encrypted is plain, i.e. readable and understandable. To verify a given truncated encipherment appended to the plaintext of a given document, the same encryption and truncation steps which were performed for establishing the given truncated encipherment are again performed and the latter truncated encipherment is compared to the truncated encipherment appended to the plaintext. The verification occurs by performing the same encryption and, in one embodiment, the same truncation operations with the plaintext to compare the result with the truncated enciphered attachment to the plaintext.

Figure 7A:
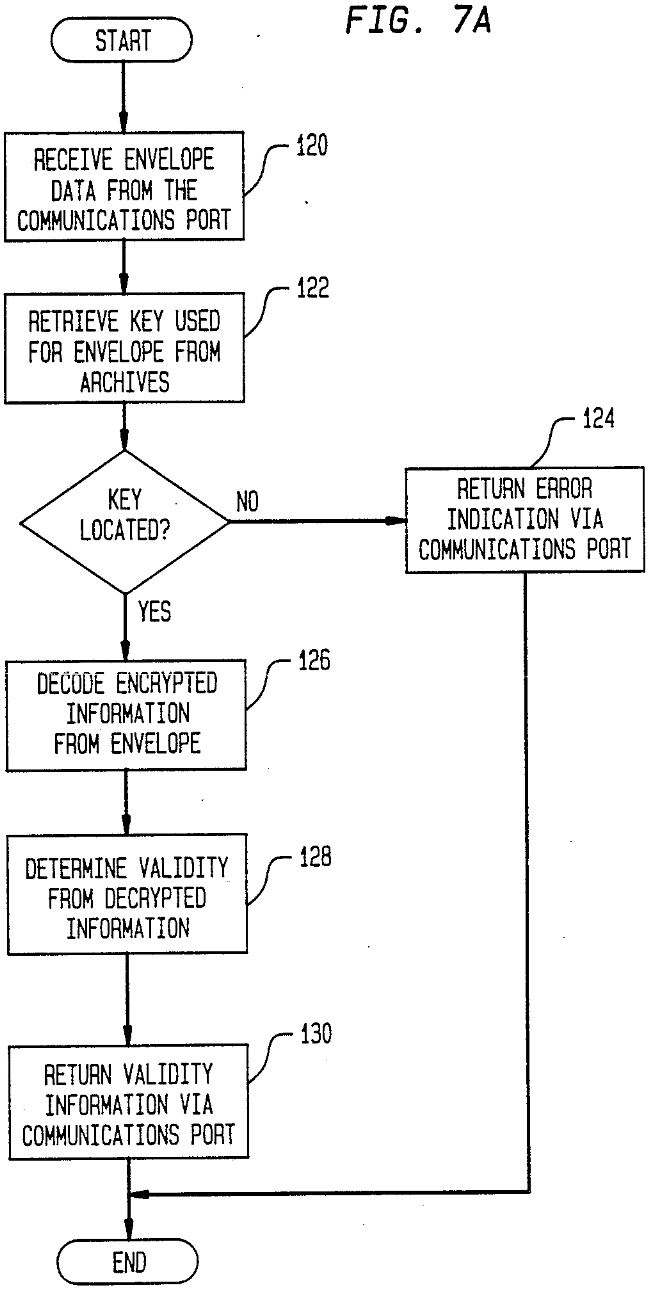
* and FIGS. 7*a* and 7*b* are flow charts depicting different operational embodiments of the portion of the system shown in FIG. 5*b*.

Referring to FIG. 7*a*, a flow chart depicting the operation of using the first form of decryption for validation is set forth. Initially, mail piece data is received 120 via a communication port 100 at the funds control center 26 validation section. It will be understood that the mail piece data can be received either vocally, via DTMF impressed information, via computer or via any other means of conveying that information to the center. Regardless of the method of conveyance, upon receipt of the information, the key retrieval system attempts to locate the encryption key 122 that was issued for the particular batch of mail having the subject mail piece as a member. If the attempt fails 124, that is, the mail piece did not originate from a batch processed by this particular funds control center, an error, or non-validating, message is returned to the requester.

However, in the event that the encryption key is located, the cryptographic system decodes 126 the encrypted information appearing on the mail piece. The decrypted information is then examined by the validation system to determine 128 if it is properly formed and corresponds to the known information stored in the archival system. An indication of the validity is then returned 130 to the requester via the communications port 100 and the session is terminated.

Figure 7B:
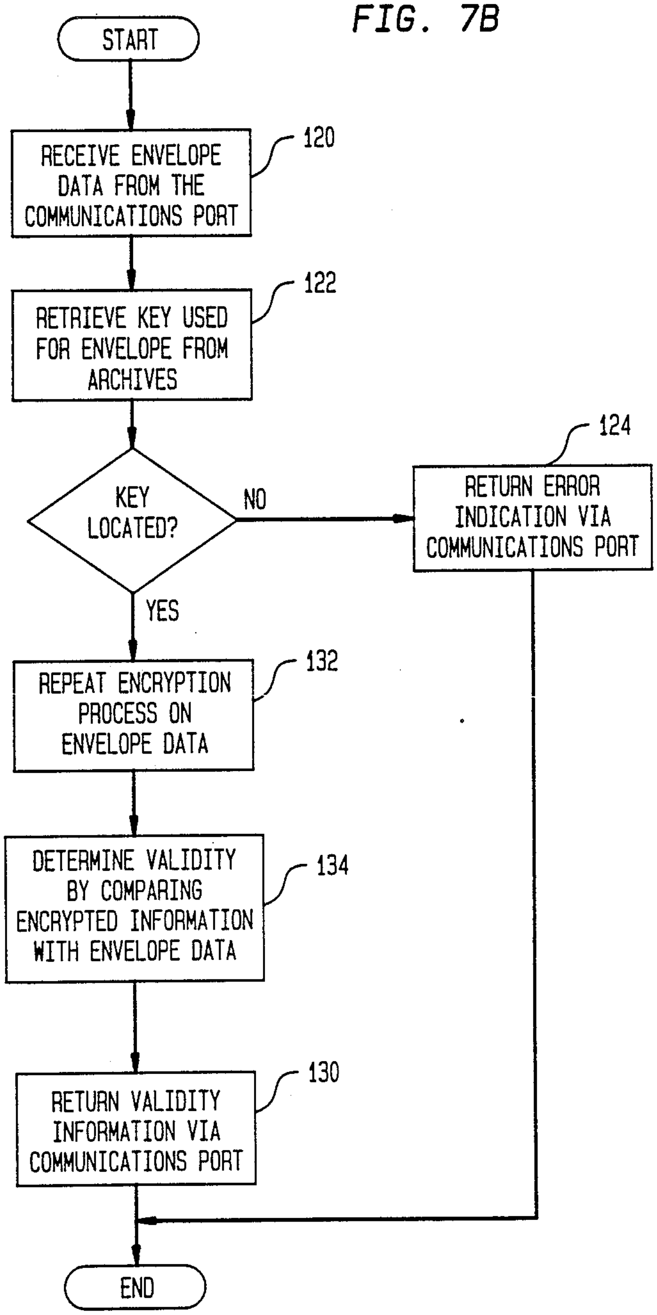

With respect to the validation procedure shown in FIG. 7*b*, the operation is essentially the same as previously described with respect to that shown in FIG. 7*a* with the exception that, rather than decrypting the encrypted information, the original information is re-encrypted 132 and compared 134 with the originally encrypted information to ascertain the validity of that mail piece. The result of this comparison is then returned 130 to the inquiring party for use thereby.

Although the present system has been described with regard to a specific embodiment, it will be understood that other arrangements and configurations may also be developed that, nevertheless, do fall within the spirit and scope of the present invention. Consequently, the scope of the present invention is deemed limited only by the appended claims and the reasonable interpretation thereof.

What is claimed is:

1. A secure postage dispensing system, said system comprises:

means for receiving mailing information; said mailing information including a list of addresses, said list of addresses being associated with a number of mail pieces to be sent, and information indicative of the postage due for said mail pieces;

means for calculating the total postage required for said mail pieces;

means for establishing communication with a funds control center, said funds control center being adapted to receive said total postage and the total number of mail pieces to be mailed, said funds control center including means for effecting a funds transfer in the amount of said total postage to a carrier service and, upon completion of said funds transfer, returning a cryptographic key and a batch identifier;

means, using said cryptographic key, for providing a unique encrypted number for each address in said list of addresses; and means for outputting said list of addresses, each said address having said unique encrypted number appended thereto.

2. System as claimed in claim 1 further comprises:

means for storing said received mailing information.

3. System as claimed in claim 1 wherein said information indicative of the postage due includes weight information.

4. System as claimed in claim 1 further comprises:

means for appending the zip code of each address on said list of addresses.

5. System as claimed in claim 4 further comprises:

means for sorting said appended list of addresses according to said appended zip codes.

6. System as claimed in claim 5 further comprises:

a control interface, said control interface including means for entering control information and a display, said control interface communicating with said address appending means, said sorting means, said postage calculation means and said encrypted number providing means.

7. System as claimed in claim 1 further comprises:

means for controlling a printer such that a plurality of mail pieces can be generated each having one of said unique encrypted numbers printed thereupon.

8. System as claimed in claim 7 further comprises:

means for validating any said mail piece.

9. System as claimed in claim 8 wherein said validating means includes:

means for receiving mail piece information, said mail piece information received including said unique encrypted number and batch identifying information;

means for retrieving said encryption key, said retrieval being based upon said batch indentifier; and means for comparing said mail piece information with information based upon said encryption key such that the validity of said mail piece is determined by the result of said comparison.

10. A method for securely dispensing postage, said method comprising the steps of:

receiving mailing information; said mailing information including a list of addresses, said list of addresses being associated with a number of mail pieces to be sent, and information indicative of the postage due for said mail pieces;

calculating the total postage required for said mail pieces;

establishing communication with a funds control center, said funds control center being adapted to receive said total postage and the total number of mail pieces to be mailed, said funds control center including means for effecting a funds transfer in the amount of said total postage to a carrier service and, upon completion of said funds transfer, returning a cryptographic key and a batch identifier;

providing a unique encrypted number for each address in said list of addresses; and outputting said list of addresses, each said address having said unique encrypted number appended thereto.

11. Method as claimed in claim 10 further including the step of:

including weight information with said information indicative of the postage due.

12. Method as claimed in claim 10 further including the step of:

appending the zip code of each address on said list of addresses.

13. Method as claimed in claim 12 further including the step of:

sorting said appended list of addresses according to said appended zip codes.

14. Method as claimed in claim 13 further including the step of:

providing a control interface, said control interface including means for entering control information and a display, said control interface communicating with said address appending means, said sorting means, said postage calculation means and said encrypted number providing means.

15. Method as claimed in claim 10 further including the step of:

controlling a printer such that a plurality of mail pieces can be generated each having one of said unique encrypted numbers printed thereupon.

16. Method as claimed in claim 15 further comprising the step of:

validating any said mail piece.

17. Method as claimed in claim 16 wherein said validating step includes the steps of:

receiving mail piece information, said mail piece information received including said unique encrypted number and a batch identifier;

retrieving said encryption key, said retrieval being based upon said batch identifier; and comparing said mail piece information with information based upon said encryption key such that the validity of said mail piece is determined by the result of said comparison.

* * * * *